(12) United States Patent
Toguyeni

(10) Patent No.: US 12,233,473 B2
(45) Date of Patent: Feb. 25, 2025

(54) MANUFACTURING BIMETALLIC LINED PIPES

(71) Applicant: Acergy France SAS, Suresnes (FR)

(72) Inventor: Gregory Alexandre Toguyeni, La Garenne-Colombes (FR)

(73) Assignee: ACERGY FRANCE SAS, Suresnes (FR)

( * ) Notice: Subject to any disclaimer, the term of this patent is extended or adjusted under 35 U.S.C. 154(b) by 268 days.

(21) Appl. No.: 17/633,796

(22) PCT Filed: Aug. 10, 2020

(86) PCT No.: PCT/IB2020/000660
§ 371 (c)(1),
(2) Date: Feb. 8, 2022

(87) PCT Pub. No.: WO2021/028721
PCT Pub. Date: Feb. 18, 2021

(65) Prior Publication Data
US 2022/0314363 A1    Oct. 6, 2022

(30) Foreign Application Priority Data

Aug. 9, 2019 (GB) ..................... 1911451

(51) Int. Cl.
*B23K 20/00* (2006.01)
*B23K 20/12* (2006.01)
*B23K 101/06* (2006.01)
*B23K 101/10* (2006.01)
*B23K 103/18* (2006.01)

(52) U.S. Cl.
CPC ........ *B23K 20/127* (2013.01); *B23K 20/1265* (2013.01); *B23K 2101/06* (2018.08); *B23K 2101/10* (2018.08); *B23K 2103/18* (2018.08)

(58) Field of Classification Search
CPC ...... F17C 2203/0604; F17C 1/00; F17C 1/02; F17C 2209/22; F17C 2209/222; B23K 20/1265; B23K 2101/12
See application file for complete search history.

(56) References Cited

U.S. PATENT DOCUMENTS

| 3,616,521 | A * | 11/1971 | Boggio | .................. | B21D 51/24 29/446 |
| 10,010,970 | B2 * | 7/2018 | Toguyeni | ................ | E21B 19/16 |
| 10,016,840 | B2 * | 7/2018 | Atin | .................... | B23K 37/0276 |
| 10,406,577 | B2 * | 9/2019 | Toguyeni | .............. | B21C 37/154 |
| 11,253,950 | B2 * | 2/2022 | Toguyeni | .............. | F16L 59/065 |
| 11,819,938 | B2 * | 11/2023 | Toguyeni | .............. | F16L 59/065 |

(Continued)

*Primary Examiner* — Erin B Saad
(74) *Attorney, Agent, or Firm* — MATTINGLY & MALUR, PC

(57) ABSTRACT

A liner sleeve is secured within a host pipe of a bimetallic lined pipe by driving a spinning friction stir welding tool through the liner sleeve but not through the full wall thickness of the host pipe. This forms a thermo-mechanically affected welded zone in which metal of the liner sleeve is bonded with some metal of the host pipe. Relative movement between the spinning tool and the lined pipe extends the welded zone along a weld path. Where the pipe is mechanically lined, the welded zone extends along a previously unbonded outboard region that extends longitudinally from an inboard region at which the liner sleeve is bonded mechanically to the host pipe.

16 Claims, 14 Drawing Sheets

(56) References Cited

U.S. PATENT DOCUMENTS

| | | | | |
|---|---|---|---|---|
| 2002/0014490 | A1* | 2/2002 | Robertson | B01J 3/03 |
| | | | | 220/592.01 |
| 2006/0255094 | A1* | 11/2006 | Taylor | B23K 20/1265 |
| | | | | 228/101 |
| 2015/0338023 | A1* | 11/2015 | Coors | F15B 1/165 |
| | | | | 138/30 |
| 2017/0080518 | A1* | 3/2017 | Toguyeni | E21B 17/04 |
| 2017/0080519 | A1* | 3/2017 | Atin | B23K 20/123 |
| 2017/0341119 | A1* | 11/2017 | Toguyeni | F16L 58/08 |
| 2018/0221984 | A1* | 8/2018 | Toguyeni | B23K 20/122 |
| 2019/0366472 | A1* | 12/2019 | Toguyeni | F16L 55/1116 |
| 2021/0071808 | A1* | 3/2021 | Toguyeni | B29C 66/14 |
| 2022/0152729 | A1* | 5/2022 | Toguyeni | F16L 59/06 |

\* cited by examiner

MANUFACTURING BIMETALLIC LINED PIPES

This invention relates to the manufacture of bimetallic lined pipes as used in the oil and gas industry, particularly in the subsea oil and gas industry. Pipelines fabricated from successive lengths of such pipes may, for example, be used to transport 'sour' well fluids that contain corrosive compounds.

Rigid subsea pipelines are typically formed of lengths of steel pipe—'pipe joints'—that are welded together end-to-end. In S-lay and J-lay operations, pipe joints are welded together offshore aboard an installation vessel as the resulting pipeline is laid. S-lay involves launching the pipeline horizontally from a vessel and then over a stinger that supports an overbend of the pipeline. Conversely, J-lay involves lifting pipe joints into an upright orientation for welding to the upper end of the pipeline, the remainder of which hangs near-vertically from the vessel. In both cases, the pipeline extends down through the water column to a sag bend that leads to a touchdown point on the seabed.

In reel-lay operations, pipe joints are welded together into pipe stalks onshore at a coastal yard or spoolbase and then the pipe stalks are welded together end-to-end to spool the prefabricated pipeline onto a reel. The spooled pipeline is then transported offshore for laying. When spooling, bending of the pipeline along its length extends beyond elastic limits into plastic deformation that must be recovered by subsequent straightening processes when unspooling before laying.

It will be apparent that whether S-lay, J-lay or reel-lay methods are employed to lay a rigid pipeline, the pipeline will experience substantial stresses and strains. Such stresses and strains are particularly prevalent before and during laying as the pipeline is spooled onto a reel, straightened, deflected through an overbend or deflected through a sag bend, as the case may be, during spooling and/or laying. Stresses and strains are also experienced after a pipeline is laid, for example due to thermal cycling in use.

Stresses and strains are most severe when spooling a rigid pipeline onto a reel and subsequently straightening the pipeline, as those operations involve plastic deformation of the steel of the pipe as noted above. Particular problems arise when bending a lined rigid pipeline, which may be required for transporting well fluids containing corrosive compounds such as hydrogen sulphide and chlorides.

A bimetallic lined pipe typically comprises a load-bearing, thick-walled, high-strength, outer host pipe of low-alloy carbon steel, lined with a thin-walled liner sleeve of a corrosion-resistant alloy (CRA). The outer pipe resists buckling stresses and also hydrostatic pressure when underwater. Conversely, the inner sleeve provides little mechanical strength, being just a few millimetres thick, but it protects the outer pipe from corrosive constituents of fluids carried by the pipe in use.

The use of two different materials in this way recognises that a pipe made entirely from corrosion-resistant material would be prohibitively expensive and yet could lack the essential mechanical properties that are provided by the strong outer wall of a lined pipe.

CRA-lined bimetallic pipes take two forms. The first is clad pipe, in which an internal CRA liner sleeve is metallurgically bonded to the outer pipe. The second is mechanically-lined pipe or MLP, in which an interference fit between the liner sleeve and the outer pipe fixes the liner sleeve without metallurgical bonding along most of its length. An example of MLP is supplied by H. Butting GmbH & Co. KG of Germany under the trade mark 'BuBi'.

To produce a length of MLP, a tubular liner sleeve is inserted telescopically into an outer pipe as a sliding fit. Plugs are inserted into and sealed to the open ends of the liner sleeve. Then, both the liner sleeve and the outer pipe are expanded radially by internal hydraulic pressure applied to the liner sleeve.

Hydraulic expansion of the liner sleeve is illustrated in FIGS. 1 and 2 of the drawings. In this method, a lined pipe joint 10 comprising an outer pipe 12 of carbon steel containing a concentric tubular liner sleeve 14 of CRA is rotationally symmetrical about a central longitudinal axis 16. The pipe joint 10 is clamped in a backing assembly 18 that surrounds the pipe joint 10.

Each open end of the pipe joint 10 is sealed by a respective plug 20 that fits tightly within the liner sleeve 14. FIG. 1 shows one of those plugs 20 being inserted into an end of the pipe joint 10.

Next, as shown in FIG. 2, the interior of the liner sleeve 14 is filled with water 22 through a port 24 extending through the plug 20. The water 22 is then pressurised, using a pump 26 shown schematically in FIG. 2, to push the liner sleeve 14 radially outwardly against the inner surface of the outer pipe 12.

The expanding liner sleeve 14 undergoes radially-outward plastic deformation to apply radial expansion force to the outer pipe 12, which undergoes radially-outward plastic or elastic deformation as a result. Once the internal pressure is relaxed, radially-inward elastic shrinkage of the outer pipe 12 onto the plastically-expanded liner sleeve 14 effects a mechanical bond 28 by interference between the liner sleeve 14 and the outer pipe 12. Then, the system is depressurised and drained, whereupon the plug 20 is removed from the pipe joint 10 as shown in FIG. 3.

MLP benefits from an economical production process that makes it much less expensive than clad pipe. This can save tens of millions of US dollars in a large subsea project, considering the many kilometres of lined pipe that may be required. However, bimetallic lined pipelines present technical challenges, whether clad or mechanically lined. In both cases, the end of the liner sleeve has to be adjusted to the length of the outer host pipe. Also, welding together bimetallic lined pipe joints is complex because of the CRA-to-CRA weld.

Certain technical challenges are particularly acute in the case of MLP. In this respect, it will be apparent from FIG. 3 that the mechanical bond 28 between the outer pipe 12 and the liner sleeve 14 is only effected where the liner sleeve 14 was exposed to the pressurised water 22, inboard of the plug 20. Thus, there is no effective mechanical bond between the liner sleeve 14 and the outer pipe 12 at the end portion 30 where the plug 20 shielded the liner sleeve 14 from the pressurised water 22. This substantial end portion 30 of the lined pipe joint 10 must therefore be cut away, which is wasteful of the expensive CRA material of the liner sleeve 14.

Another challenge presented by MLP especially is that the liner sleeve can slip longitudinally relative to the outer pipe when a pipeline is bent along its length. Slippage of the liner sleeve is a particular problem when MLP is used in reel-lay operations. When the pipeline undergoes plastic deformation during spooling, unspooling and straightening, the thin-walled liner sleeve can suffer significantly greater deformation than the thick-walled outer pipe, which has much greater yield strength. This deformation manifests itself as buckling or wrinkling of the liner sleeve, especially around the intrados or inner curve of the pipe bend. A wrinkled liner sleeve may hinder the smooth flow of well fluids, may decrease fatigue life due to stress concentration and may preclude effective pigging of the pipeline.

A further challenge of lined pipelines in general, and MLP in particular, is that leaking fluids can migrate between the liner sleeve 14 and the outer pipe 12. To reduce the risks of such leakage and of the liner sleeve 14 slipping relative to the outer pipe 12, the liner sleeve 14 and the outer pipe 12 are typically bonded together at the ends of the lined pipe joint 10. The liner sleeve 14 and the outer pipe 12 can be chemically bonded or metallurgically bonded by being welded together with a filler material.

This extra bonding between the liner sleeve 14 and the outer pipe 12 is known in the art as an 'overlay'. The overlay is typically applied after the end portion 30 of the lined pipe joint 10 outboard of the mechanical bond 28 has been cut away. The end of the liner sleeve 14 may also be machined inboard away from the cut end of the outer pipe 12.

GB 2508175 further describes the background of MLP and overlays. To address the problem of liner wrinkling, it proposes an overlay of extended length. Manufacturing such an overlay is expensive and time-consuming as it requires extra machining and the skill of an expert welder. FR 3064039 also discloses an overlay. Here, a groove is machined into the pipe end and filled with material that improves sealing. It has much the same drawbacks as the proposal disclosed in GB 2508175.

It is against this background that the present invention has been devised. The invention seeks to simplify and to reduce the cost of manufacturing overlays in bimetallic lined pipe joints, especially pipe joints of MLP.

In one sense, the invention resides in a method of securing a liner sleeve within a host pipe of a bimetallic lined pipe. The method comprises: inserting a friction stir welding (FSW) tool into the lined pipe; driving the FSW tool, when spinning about a spin axis, into the liner sleeve to form a thermo-mechanically affected zone (TMAZ) in which metal of the liner sleeve is bonded with metal of the host pipe; and effecting relative movement between the spinning FSW tool and the lined pipe with respect to a central longitudinal axis of the lined pipe to extend the TMAZ along a weld path.

Relative rotational movement between the spin axis of the FSW tool and the lined pipe may be effected by moving the FSW tool and/or the lined pipe to extend the TMAZ around the liner sleeve. For example, at least one continuous circumferential loop of the weld path may be formed in a plane that is orthogonal to the central longitudinal axis of the lined pipe. At least an initial one of those loops may be formed at a starting location spaced longitudinally inboard from an end of the lined pipe. Similarly, at least a terminal one of those loops may be formed at a finishing location at an end of the lined pipe.

Relative longitudinal movement between the spin axis of the FSW tool and the lined pipe may be effected by moving the FSW tool and/or the lined pipe to extend the TMAZ along the liner sleeve. For example, the weld path may spiral along and around the liner sleeve in successive loops that are inclined relative to the central longitudinal axis of the lined pipe. At least one loop or section of the weld path suitably overlaps a preceding loop or section of the weld path.

The TMAZ may be extended toward an open end of the lined pipe. The weld path may be terminated within the lined pipe, in which case a sacrificial part of the lined pipe, on which the weld path terminates, may then be removed. Alternatively, the TMAZ may be extended beyond the lined pipe to terminate the weld path on a part that is temporarily attached to the lined pipe. That part may then be removed and optionally re-attached to another lined pipe about to undergo similar processing.

The spin axis suitably extends substantially radially with respect to the lined pipe. The FSW tool may therefore be advanced radially outwardly along the spin axis into contact with the liner sleeve.

Where the lined pipe is a mechanically-lined pipe having an inboard region in which the liner sleeve is bonded mechanically to the host pipe, the method suitably comprises extending the TMAZ along an outboard region that extends longitudinally from the inboard region toward an end of the lined pipe. The weld path preferably overlaps the inboard region, conveniently by starting formation of the TMAZ in the inboard region.

Correspondingly, the inventive concept embraces a bimetallic lined pipe comprising a liner sleeve within a host pipe, wherein the liner sleeve is secured to the host pipe by at least one welded zone formed by friction stir welding along a weld path in which metal of the liner sleeve is bonded with metal of the host pipe.

The weld path suitably comprises at least one continuous circumferential loop in a plane orthogonal to a central longitudinal axis of the lined pipe. At least one of those loops may be spaced longitudinally inboard from an end of the lined pipe or may be positioned at an end of the lined pipe.

FSW is a joining process performed between facing surfaces of abutting metal parts. A specially-profiled pin, tip or probe protruding from the end of a rapidly-rotating tool is driven through the junction between the parts and then traversed along a weld path. The tool spins about an axis that is substantially perpendicular to the surface of the metal into which the probe is driven.

Friction between the rotating probe and the stationary parts generates heat that is sufficient to soften—but not to melt—the metal of the parts. Whilst FSW is regarded as a substantially solid-state process, the metal of the abutting parts adjacent to the probe undergoes a temporary transformation into a plasticised state. When in that plasticised state, the metal experiences highly dynamic fluid flow driven by the spin of the probe.

Specifically, the rapid stirring action of the rotating probe intermixes the softened metal of the two parts along the region of their abutting interface. This intense deformation adds further heat to the metal. Simultaneously, mechanical forging pressure is applied by a shoulder of the tool around the probe to consolidate the weld region. The forging pressure exerted by the tool is resisted by a weld backing member that is positioned in opposition to the tool about the weld.

As the tool advances, plasticised metal is forced behind the probe and is left behind as the probe traverses further along the joint. The plasticised metal then cools and hardens. FSW is capable of producing a consistent, high-strength joint in a single welding pass while minimising post-process operations.

An advantageous characteristic of FSW is that no filler metal needs to be added between the parts. Also, the probe is a non-consumable item although it is, of course, subject to wear and replacement in extended use.

If shielding gas is required as a barrier to oxidation of the metal being welded during FSW, a gas shroud may be positioned around the tool to provide a flow of inert gas such as argon or carbon dioxide.

Where a pipe joint is fixed, the invention contemplates FSW machines that orbit the interior of the pipe joint circumferentially and that also move axially to describe a desired weld path. Where the pipe joint is turned and moved axially instead, an FSW machine may simply remain fixed within the pipe joint. In either case, conveniently, FSW can be performed irrespective of the orientation of the parts being joined because no liquid weld pool is formed.

Thus, the invention employs FSW to bond an inner CRA liner pipe to a surrounding carbon steel outer pipe. Welding is performed from within the inner bore of the corrosion-resistant liner pipe in a lap-joint configuration so as to bond the liner pipe to the outer pipe. The welding process is autogeneous and so does not require additional filler material other than the substrate being welded.

A backing component or supporting roller can exert a radially-inward reaction force against the outer surface of the outer pipe to counteract the radially-outward force exerted by the welding tool.

The lined pipe can rotate around and advance along its longitudinal axis while the welding tool is fixed in relation to a supporting floor. Alternatively, the lined pipe can be fixed while the welding tool rotates within and along the inner pipe.

The bonded length extends around the full circumference of the CRA liner pipe and typically, for mechanically-lined pipe, also extends along the liner pipe to a length of up to 300 mm inwardly from the pipe end. The weld may be started at a set distance from the pipe end and may then progress in a spiral manner until the pipe end is reached.

Conveniently, the weld may be terminated on a sacrificial part which is then removed from the pipe. The sacrificial part could be reusable and so could be re-attached to a pipe end. More generally, the sacrificial part could be integral with the pipe or could be a separate component that is fixed to the pipe temporarily.

In principle, the invention could also be used for cladding the full pipe length as an alternative to overlay arc welding.

The invention provides various benefits. These benefits include obviating the need to machine away and waste the CRA liner material prior to welding, and the need to consume expensive CRA filler wire as used for arc welding. There is also no need to cut away large end portions of the lined pipe after hydraulic expansion. These benefits manifest themselves in reduced material and labour costs, simplification, time-saving, greater quality and improved repeatability, while lending the process to automation.

Embodiments of the invention implement a method to manufacture an overlay of a bimetallic lined pipe. The method comprises the following steps: providing a bimetallic lined pipe after bonding the liner to the host pipe; inserting a friction stir welding unit inside the bimetallic lined pipe; and friction stir welding a section of the liner to the host pipe.

In preferred embodiments of the invention, an end section of a lined pipe is reworked by friction stir welding to manufacture an overlay that ensures sealing and mechanical connection of the liner to the host pipe. The lined pipe may, for example, be a mechanically-lined pipe. The liner may suitably be of a corrosion-resistant alloy. In principle, the friction stir welding unit can form the overlay automatically.

The path of friction stir welding inside the pipe may at least comprise a spiral with overlapping turns. Such a welding path may, for example, be defined by simultaneous rotation of the pipe on pipe supports and translation of the friction stir welding unit relative to the pipe in the axial direction.

The pipe may be turned around its longitudinal axis while the friction stir welding unit is static at an initial distance of say 300 mm from the pipe end for a first, circular, circumferential weld. Then, as the pipe turns, the friction stir welding unit may be translated axially towards the pipe end to generate a helical or spiral weld.

A sacrificial exit tab may be welded to or integral with the host pipe to terminate fabrication of the overlay. Such a tab may be cut away after the overlay has been completed.

The inventive concept extends to a pipe processing station operating in accordance with the invention, and to a pipe fabrication facility comprising at least one pipe processing station of the invention.

In summary, a liner sleeve is secured within a host pipe of a bimetallic lined pipe by driving a spinning friction stir welding tool through the liner sleeve but not through the full wall thickness of the host pipe. This forms a thermo-mechanically affected welded zone in which metal of the liner sleeve is mixed and bonded with some metal of the host pipe.

Relative movement between the spinning tool and the lined pipe extends the welded zone along a weld path. Where the pipe is mechanically lined, the welded zone extends along a previously unbonded outboard region that extends longitudinally from an inboard region at which the liner sleeve is bonded mechanically to the host pipe.

To put the invention into context, reference has already been made to FIGS. 1 to 3 of the accompanying drawings, which are partial schematic side views, in longitudinal section, showing the manufacture of a mechanically-lined pipe joint.

In order that the invention may be more readily understood, reference will now be made, by way of example, to the remainder of the drawings, in which.

Figure 4:
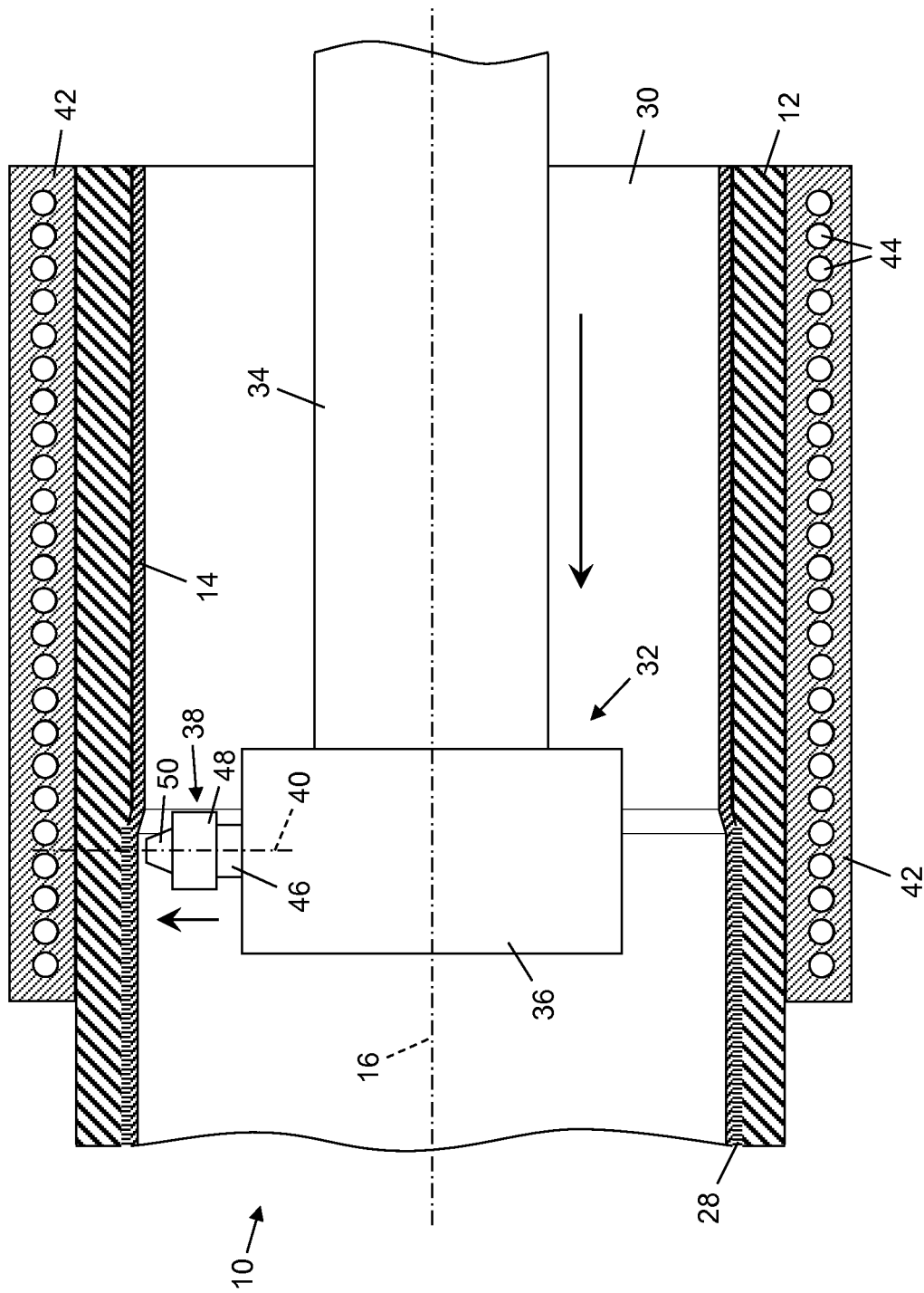
FIGS. 4 to 6 are partial schematic side views, in longitudinal section, showing initial steps of forming an overlay within the pipe joint shown in FIG. 3, in accordance with the invention.
Figure 5:
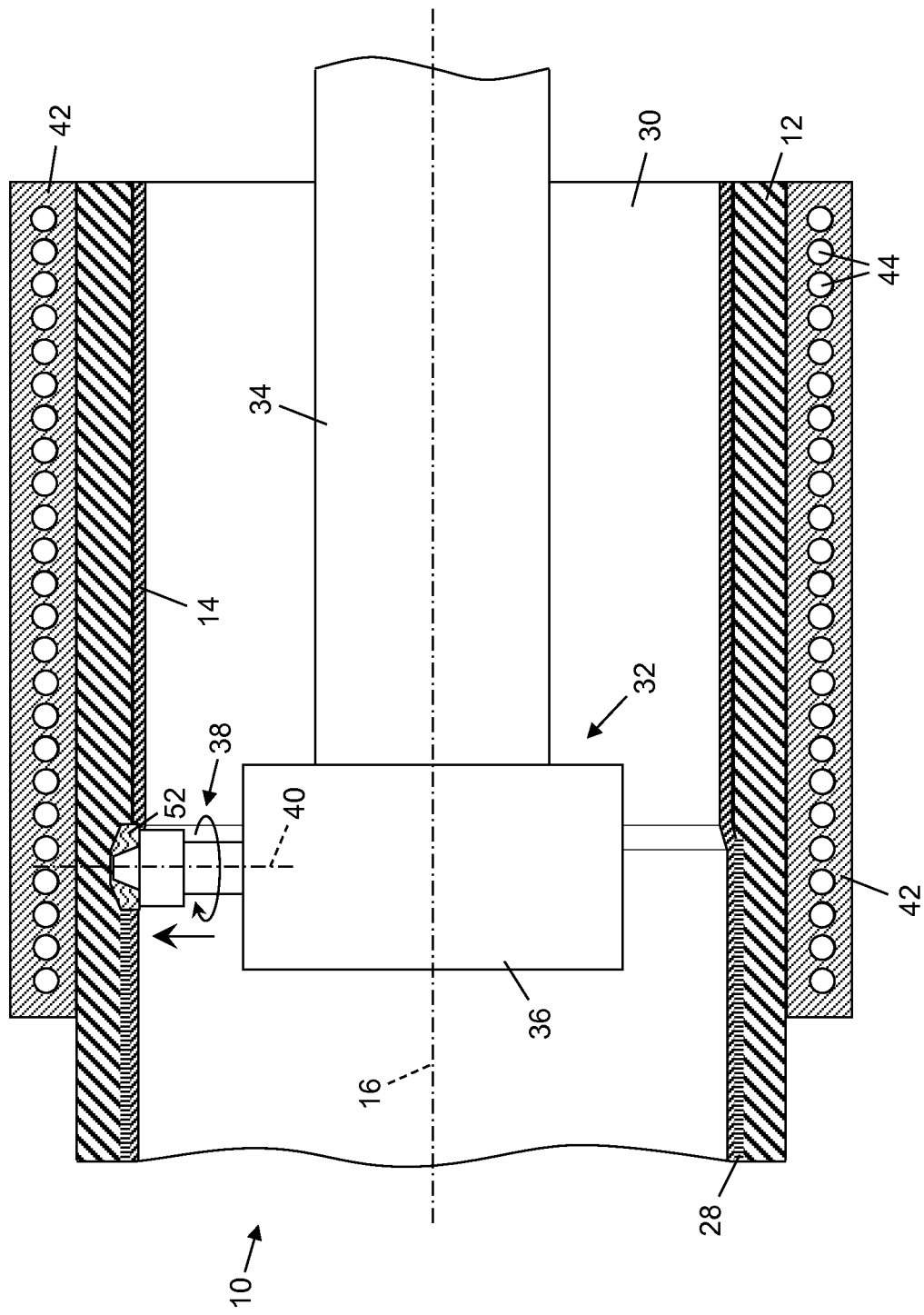
Figure 6:
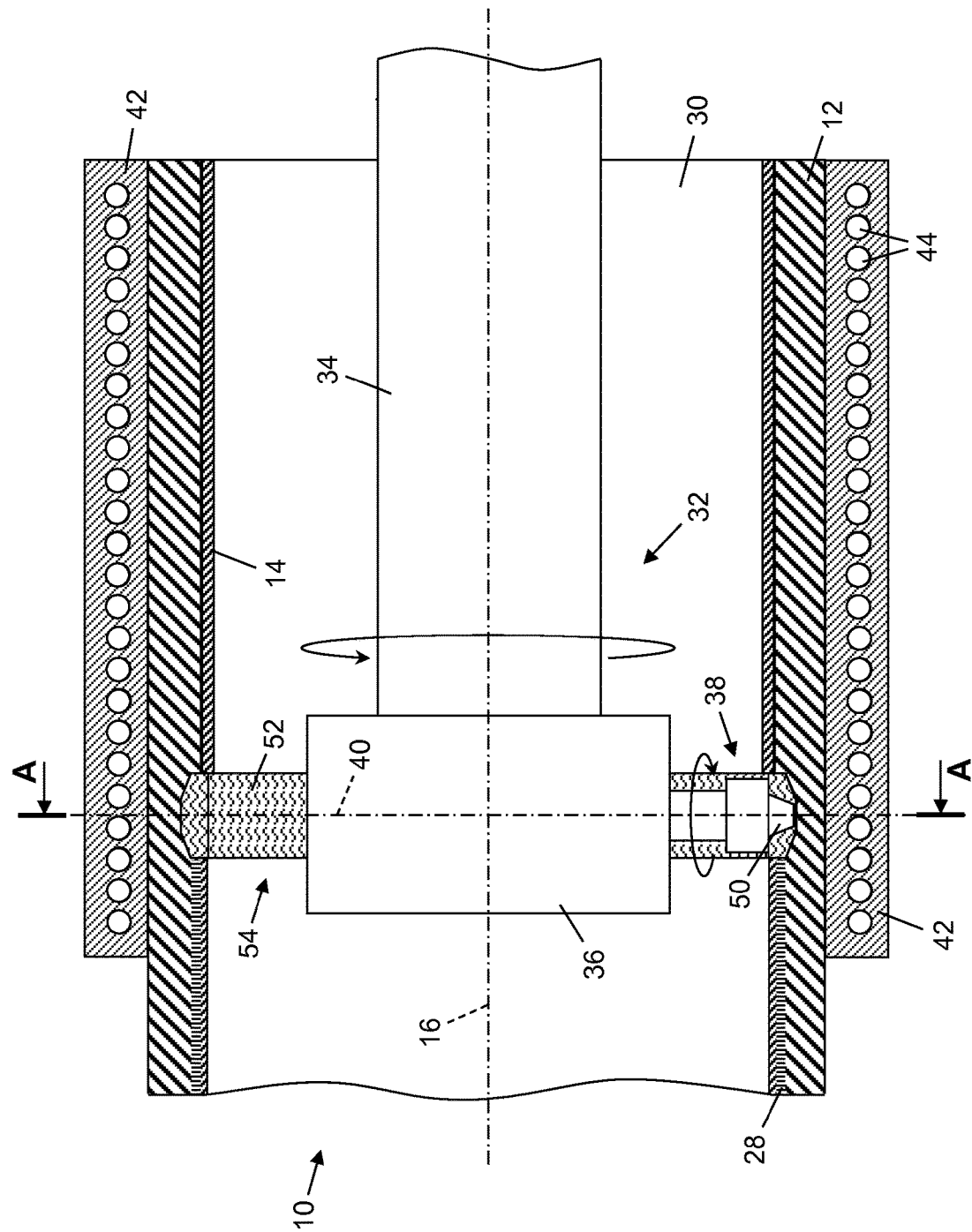
Figure 7:
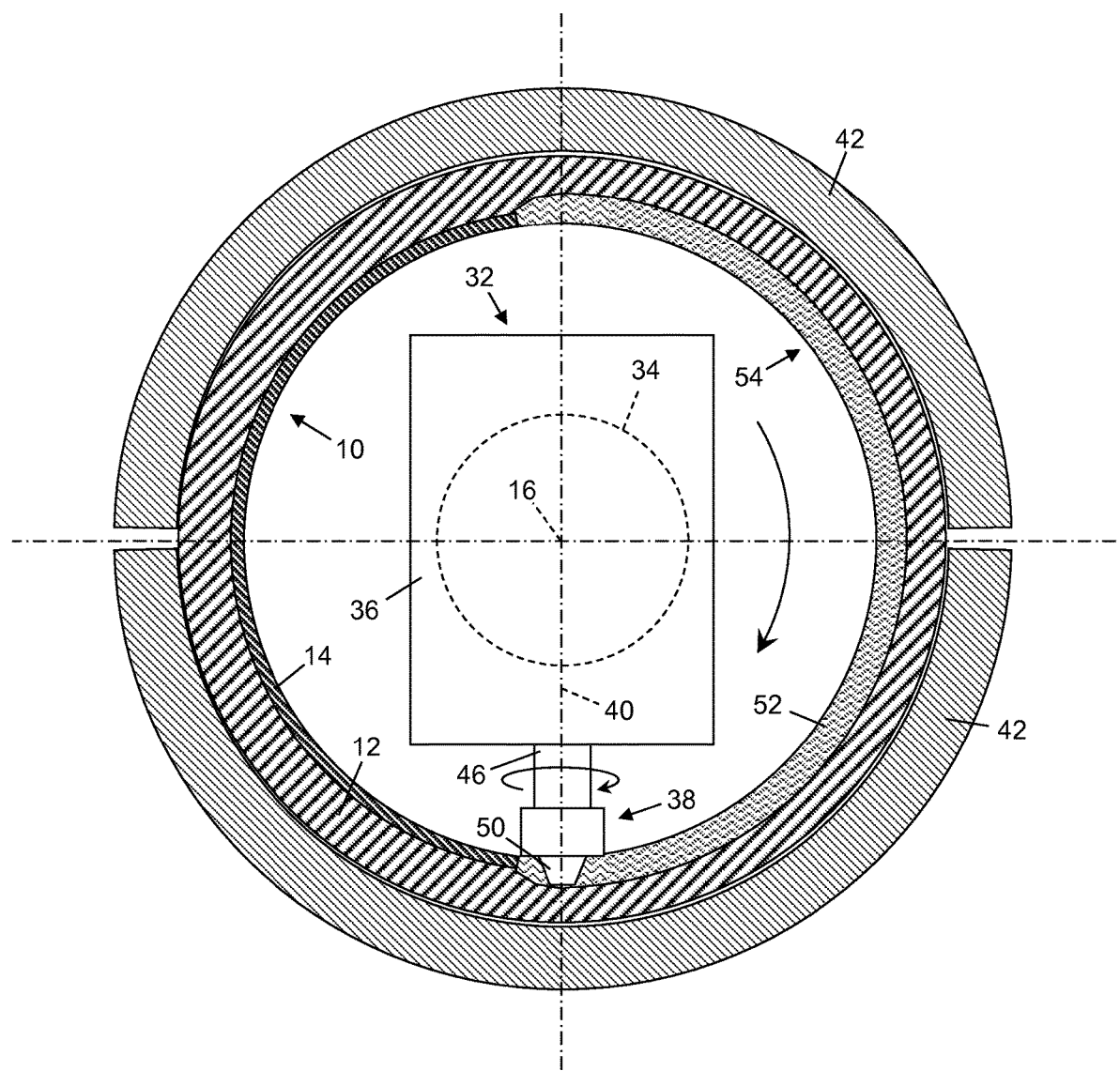
FIG. 7 is a cross-sectional view on line VII-VII of FIG. 6.
Figure 8:
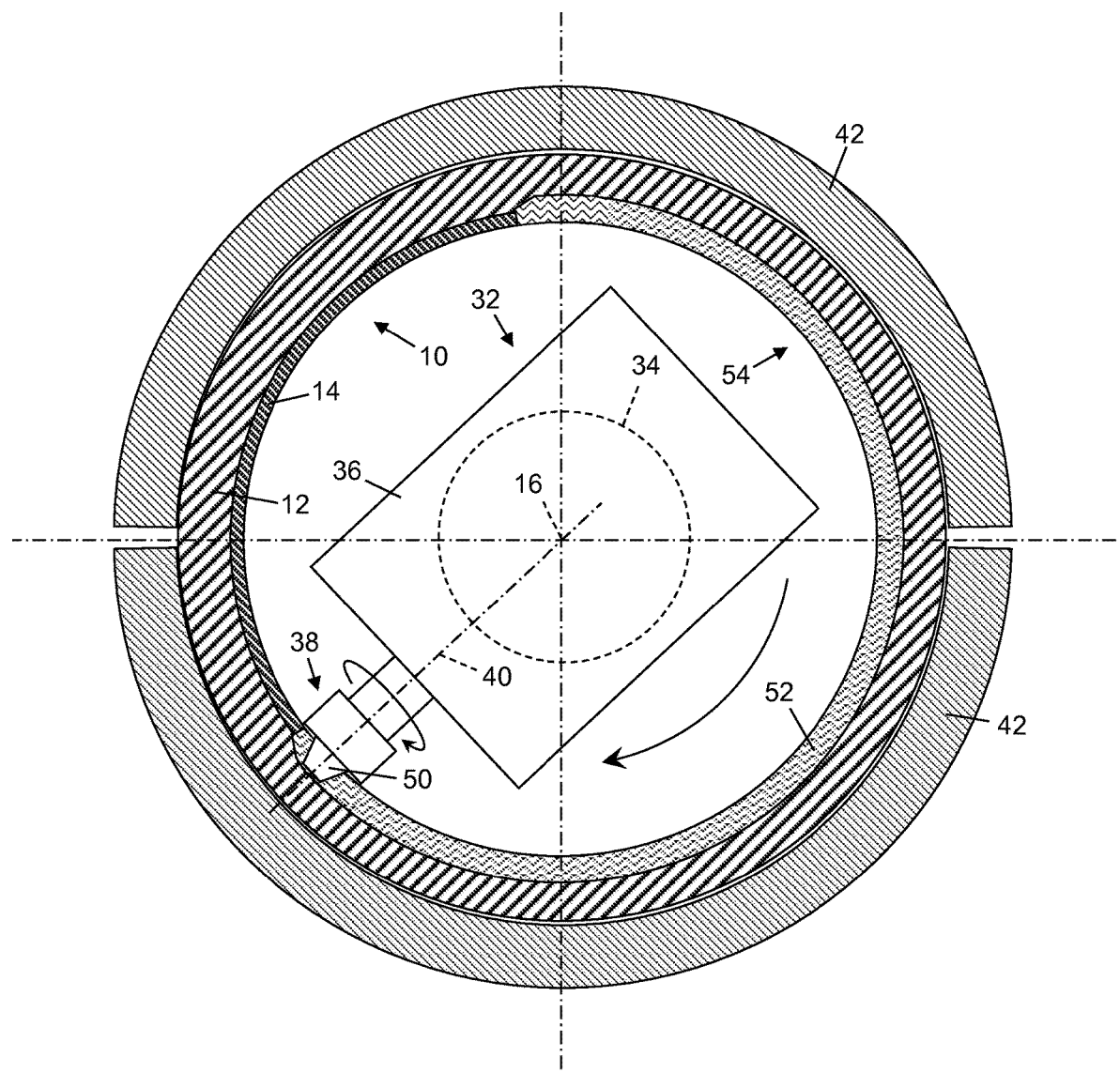
Figure 12:
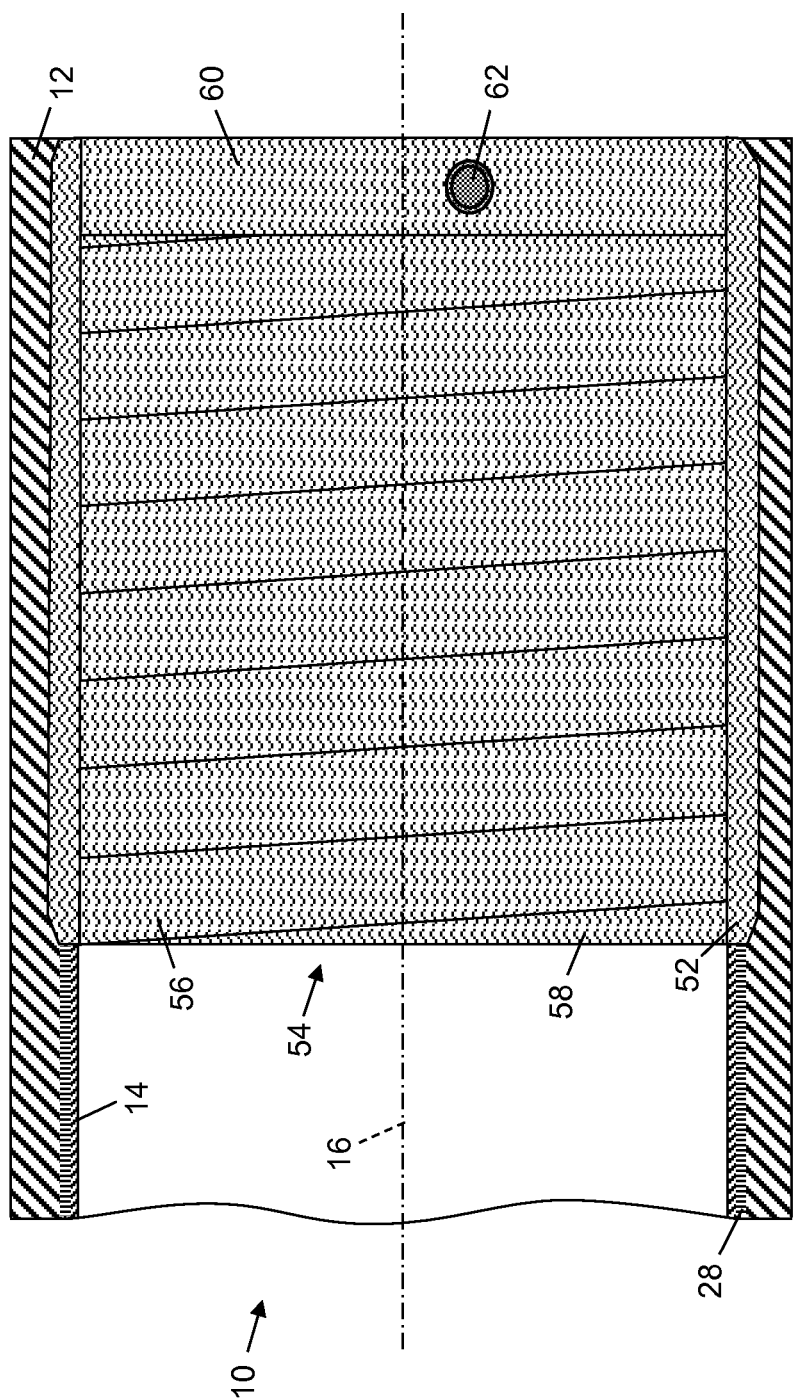
Figure 13:
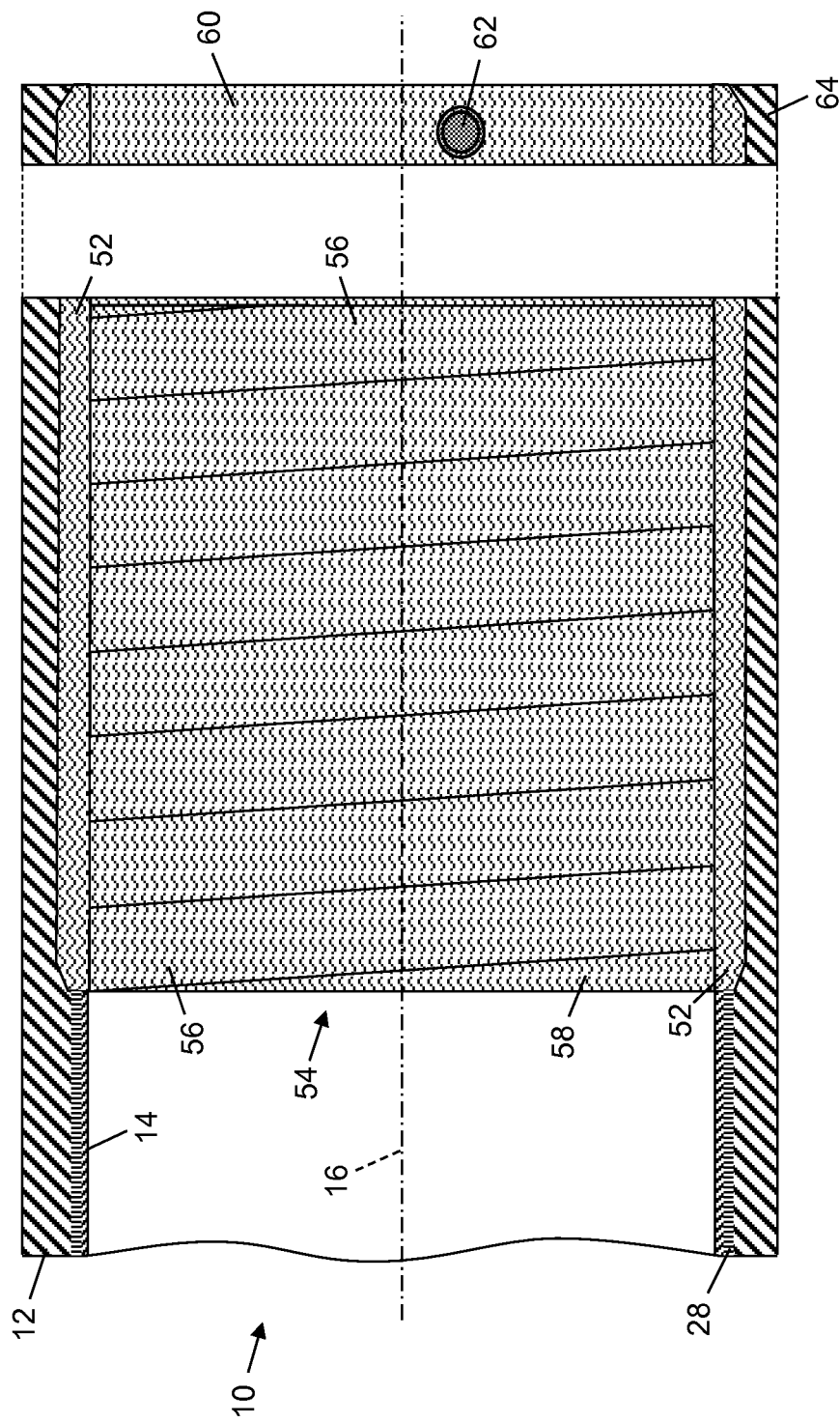
Figure 14:
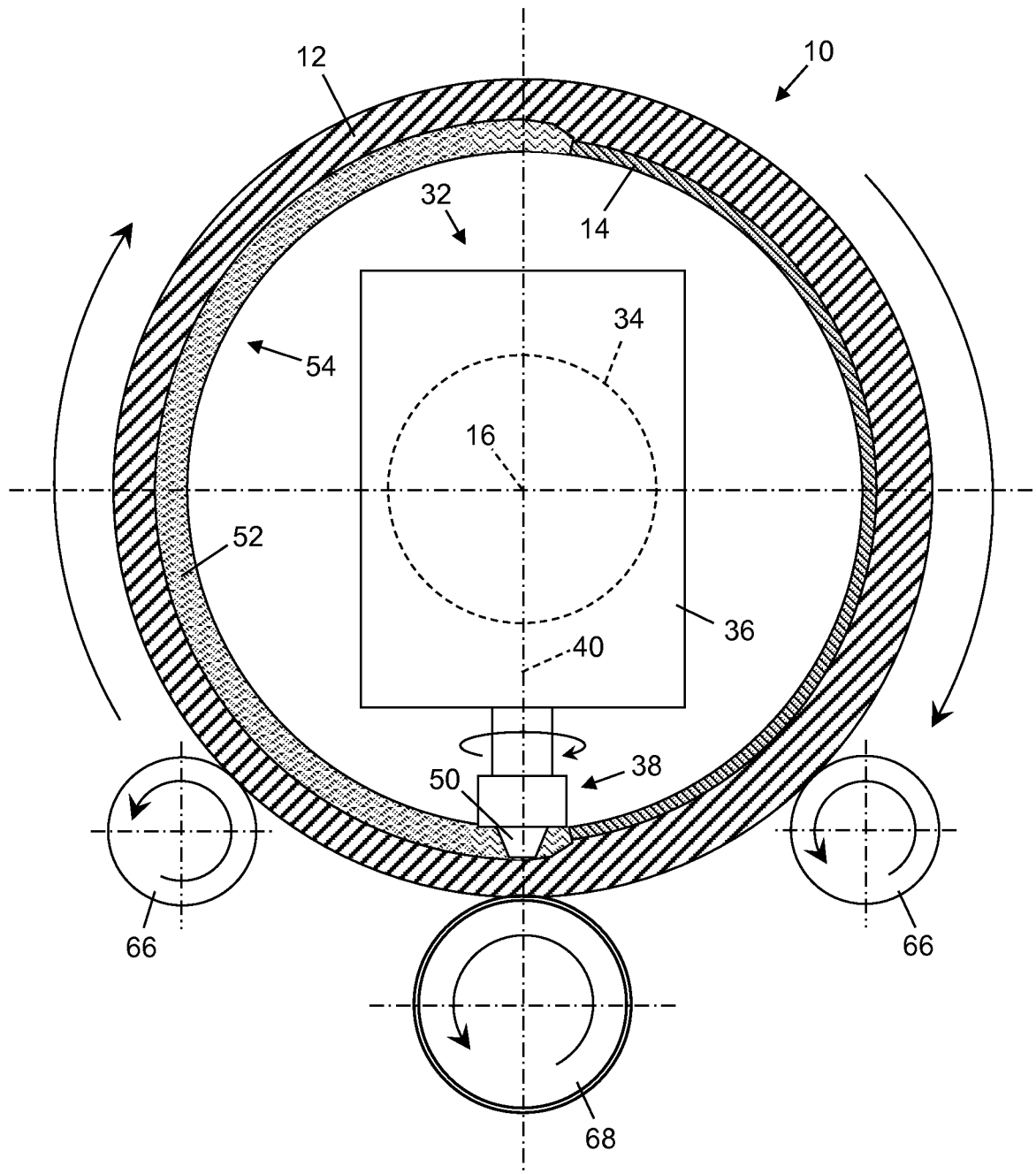

FIG. 8 corresponds to FIG. 7 but shows the weld path extending circumferentially;

FIGS. 9 to 13 correspond to FIGS. 4 to 6 and show further steps in the formation of the overlay; and FIG. 14 is a cross-sectional view showing an overlay being formed within a pipe joint in a variant of the invention.

Figure 1:
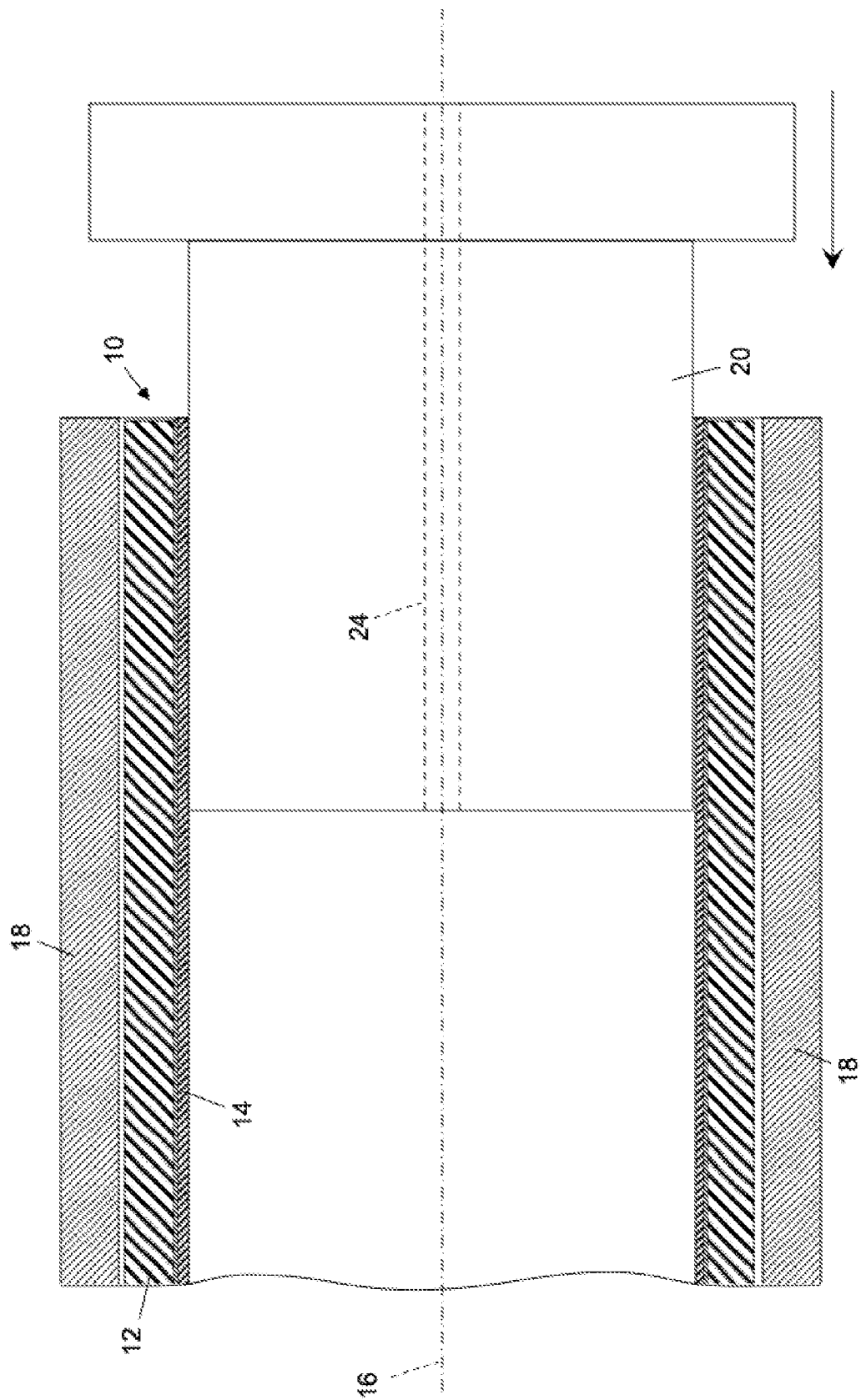
Figure 2:
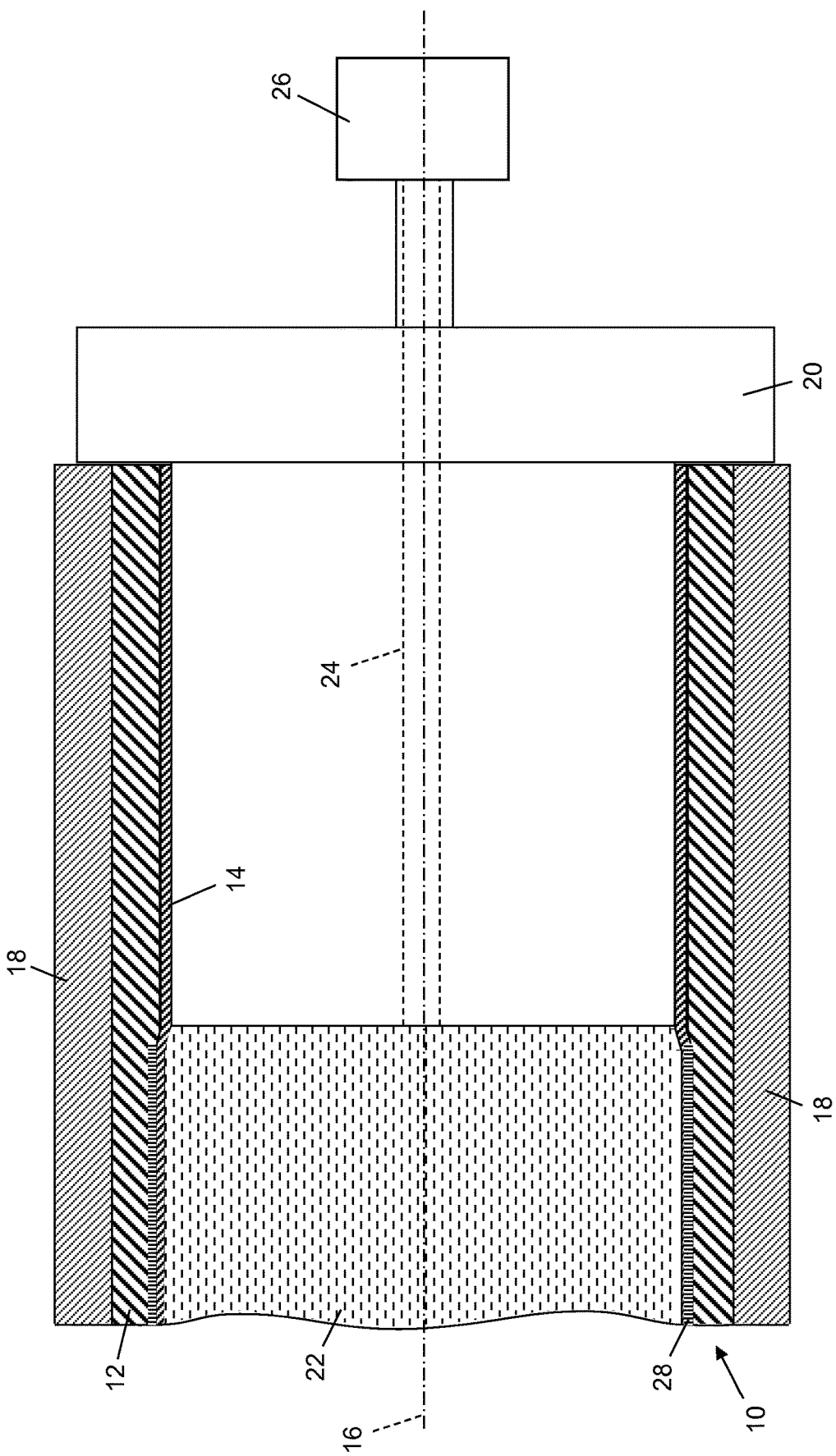
Figure 3:
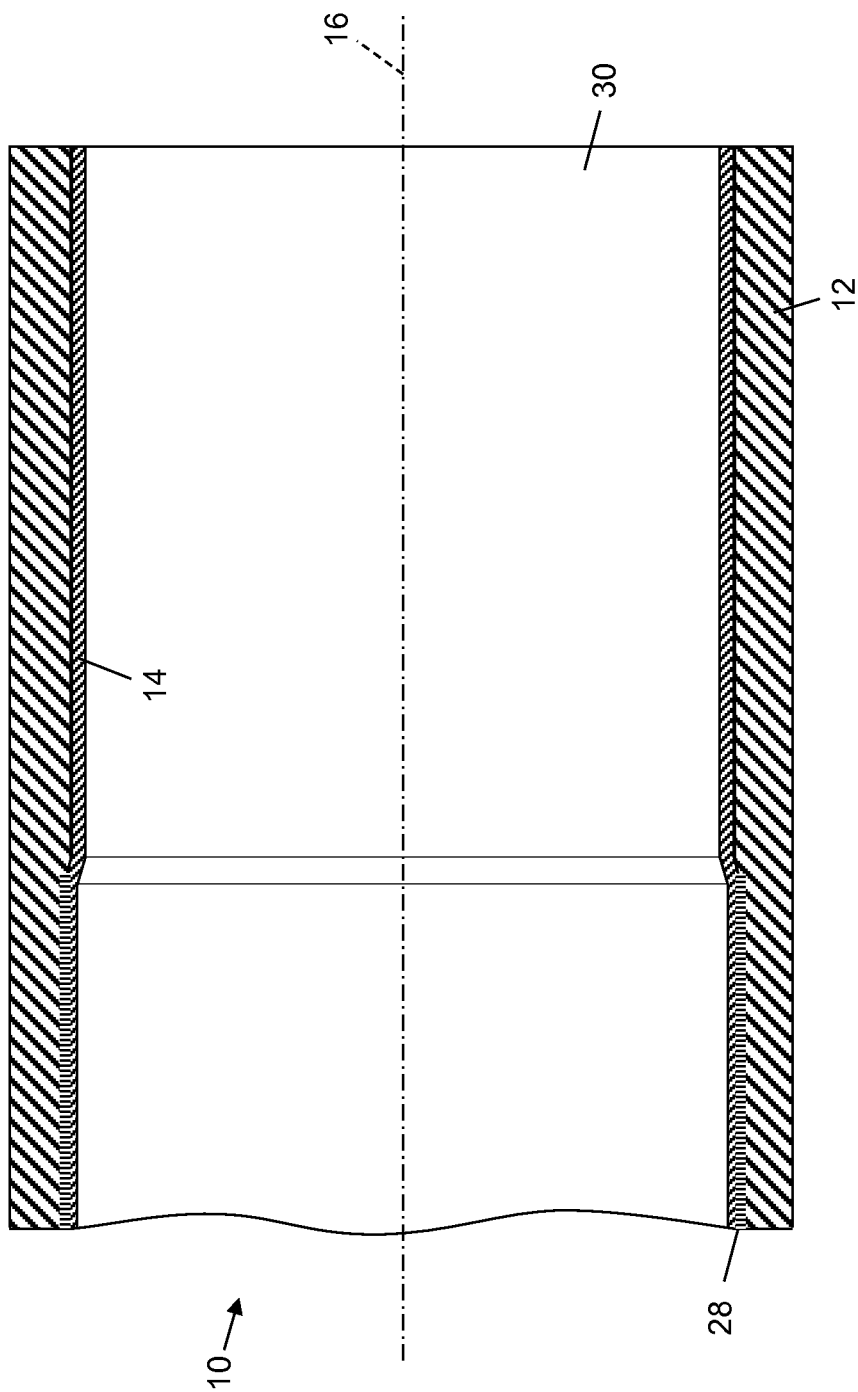

Referring firstly to FIG. 4, this shows a pipe joint 10 in the state shown in FIG. 3, namely after hydraulic expansion of the liner sleeve 14 against the outer pipe 12 to form a mechanical bond 28 inboard of the unbonded end portion 30.

Instead of cutting away the unbonded end portion 30 as in the prior art, a friction stir welding (FSW) machine 32 is inserted into the open end of the pipe joint 10 through the unbonded end portion 30. The FSW machine 32 comprises an elongate cantilever support 34, a head 36 that is mounted to a distal end of the support 34 and an FSW tool 38 that is supported and driven by the head 36.

The FSW tool 38 is driven to spin relative to the head 36 about a spin axis 40 that intersects the central longitudinal axis 16 substantially orthogonally. The FSW tool 38 can also be advanced and retracted longitudinally along the spin axis 40, hence being movable radially outwardly and inwardly with respect to the central longitudinal axis 16.

A back-up clamp 42 substantially surrounds the outer pipe 12 to provide radially-inward reaction force to support the pipe joint 10 in opposition to radially-outward forging pressure exerted on the pipe joint 10 by the FSW tool 38. The back-up clamp 42 shown here comprises optional heating and/or cooling elements 44 such as resistance elements, inductive loops or fluid pipes to add heat to, or to remove heat from, the welding process as appropriate. For example, pre-heating may be desirable to soften the metals to be welded, or to accelerate softening during welding.

The FSW tool 38 is rotationally symmetrical about the spin axis 40. The FSW tool 38 comprises a shank 46, a probe holder 48 at a distal end of the shank 46 and a probe 50 extending distally from the probe holder 44. The probe 50 has a frusto-conical shape that tapers distally in a radially-outward direction with respect to the central longitudinal axis 16.

The probe holder 48 defines a shoulder around the probe 50 to exert forging pressure on the metal softened during an FSW operation. Thus, the shoulder of the FSW tool 38 is oriented and positioned on the inner circumference of the pipe joint 10 so as to bear against the inner surface of the liner sleeve 14.

The cantilever support 34, the head 36 and the FSW tool 38 of the FSW machine 32 are supported for orbital rotation about the central longitudinal axis 16 within the pipe joint 10. The cantilever support 34, the head 36 and the FSW tool 38 of the FSW machine 32 can also be advanced and retracted distally and proximally within the pipe joint 10 along the central longitudinal axis 16. Thus, relative movement between the FSW tool 38 and the pipe joint 10 is possible both circumferentially and axially with respect to the central longitudinal axis 16. Such movements can be effected separately, so that the FSW tool 38 describes a circumferential or axial weld path within the pipe joint 10, or simultaneously, so that the FSW tool 38 describes a spiral weld path within the pipe joint 10.

The cantilever support 34 extends along the central longitudinal axis 16 from outside the open end of the pipe joint 10, and is advanced longitudinally to place the head 36 and hence the FSW tool 38 at a desired longitudinal position within and with respect to the pipe joint 10.

Initially, as shown in FIG. 4, the cantilever support 34 is advanced to place the spin axis 40 of the FSW tool 38 at a position longitudinally inboard of the transition between the mechanical bond 28 and the unbonded end portion 30. The FSW tool 38 is then advanced radially outwardly along the spin axis 40 to bring the probe 50 of the FSW tool 38 into engagement with the liner sleeve 14.

FIG. 5 shows the FSW tool 38 spinning about the spin axis 40 relative to the head 36 of the FSW machine 32 and advanced further in the radially-outward direction to a weld start point. Consequently, the spinning probe 50 of the FSW tool 38 has now penetrated the liner sleeve 14 and has created a thermo-mechanically affected zone (TMAZ) 52, which is a region that is affected metallurgically by both temperature cycling and plastic deformation, in particular stirring. It is in the TMAZ 52 that the metals of the pipe joint 10 are softened and stirred. The shoulder of the probe holder 48 bears against the inside of the liner sleeve 14, which limits insertion of the probe 50 and applies forging pressure to the softened metals in the TMAZ 52.

The TMAZ 52 extends around the frusto-conical side walls of the probe 50 and also distally beyond the tip of the probe 50. Thus, the TMAZ 52 is slightly wider than the width of the probe 50 and extends slightly deeper into the wall of the pipe joint 10 than the length of the probe 50. Specifically, the TMAZ 52 extends through the thickness of the liner sleeve 14 and into the surrounding outer pipe 12. In consequence, the CRA of the liner sleeve 14 mixes with the carbon steel of the outer pipe 12 in the TMAZ 52, effecting a strong metallurgical bond between the liner sleeve 14 and the outer pipe 12.

The depth and therefore the radial extent of the TMAZ 52 is exaggerated in these schematic drawings for clarity. In practice, the TMAZ 52 need not extend very deeply into the outer pipe 12. This preserves internal corrosion resistance along the full length of the pipe joint 10 while also maintaining wall thickness of the outer pipe 12 and hence mechanical strength.

FIGS. 6 to 8 show the head 36 of the FSW machine 32 and hence the FSW tool 38 now turning together about the central longitudinal axis 16 as the FSW tool 38 continues to spin about the spin axis 40. The spin axis 40 remains longitudinally aligned with the weld start point shown in FIG. 5, and the probe 50 of the spinning FSW tool 38 remains in its radially-advanced position engaged with the liner sleeve 14 and the outer pipe 12. Consequently, the FSW tool 38 has begun to describe a circumferential weld path 54 within the pipe joint 10, extending the TMAZ 52 into a circular or hooped shape about the central longitudinal axis 16. This starts the formation of a welded zone that serves as an overlay in accordance with the invention.

As soon as the FSW tool 38 traverses away from the region it has just stirred, the mixed softened metal of the TMAZ 52 begins to cool and solidify. If desired, cooling and hardening may be accelerated by activating the aforementioned cooling elements 44 of the back-up clamp 42.

FIGS. 6 and 7 show the head 36 and the FSW tool 38 turned through 180° about the central longitudinal axis 16, thus now facing in the opposite direction from their starting orientation at the weld start point as shown in FIG. 5. The TMAZ 52 is now substantially semi-circular.

FIG. 8 shows the head 36 and the FSW tool 38 turned beyond 180° about the central longitudinal axis 16. Thus, the FSW tool 38 is shown here approaching a full circuit of the liner sleeve 14. Welding continues until the FSW tool 38 completes a full internal circuit of the pipe joint 10 to form a continuous looped circumferential weld. Throughout this circumferential motion of the FSW tool 38, the spin axis 40 remains in a plane that is orthogonal to the central longitudinal axis 16.

Figure 9:
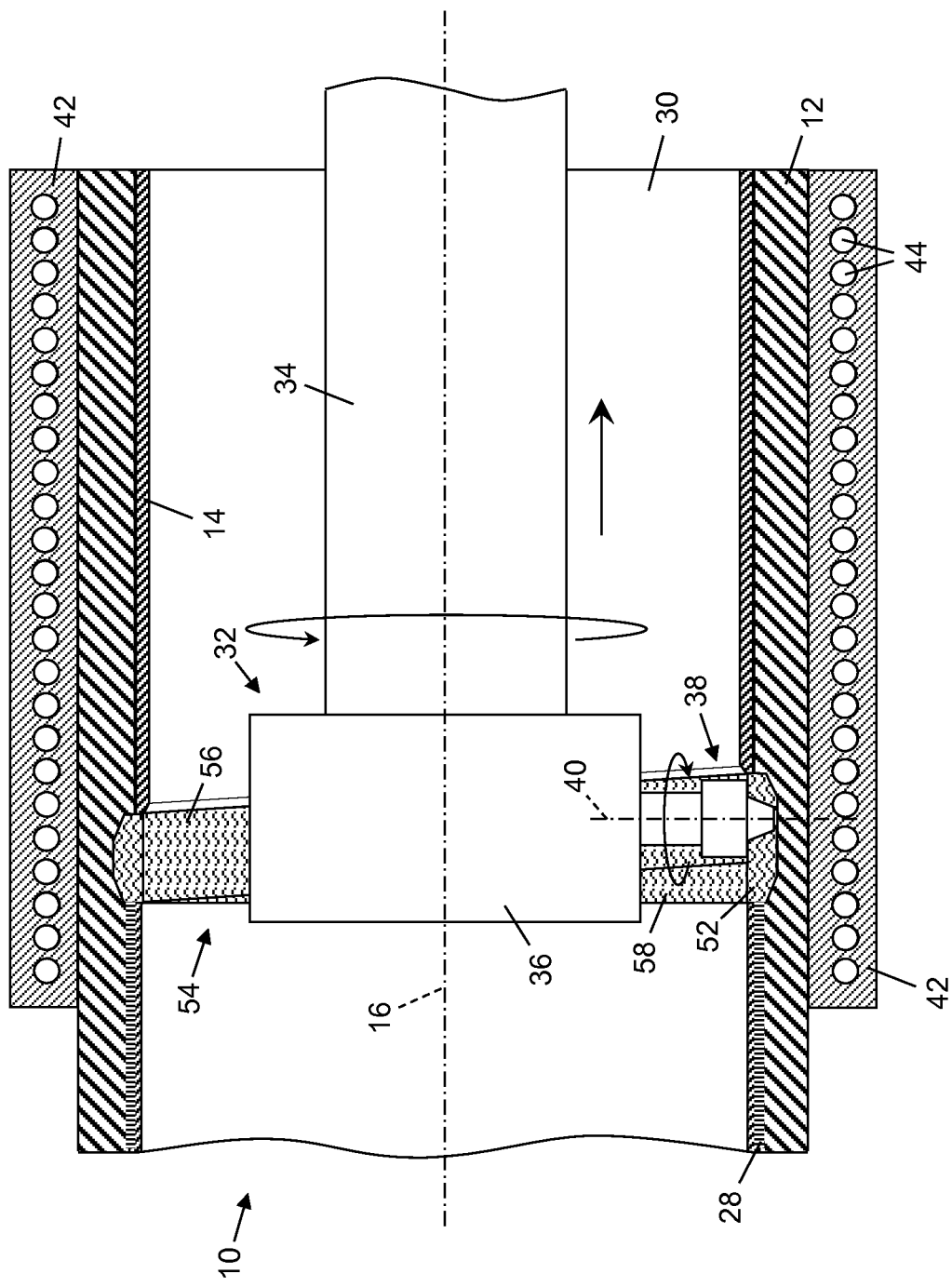
Figure 10:
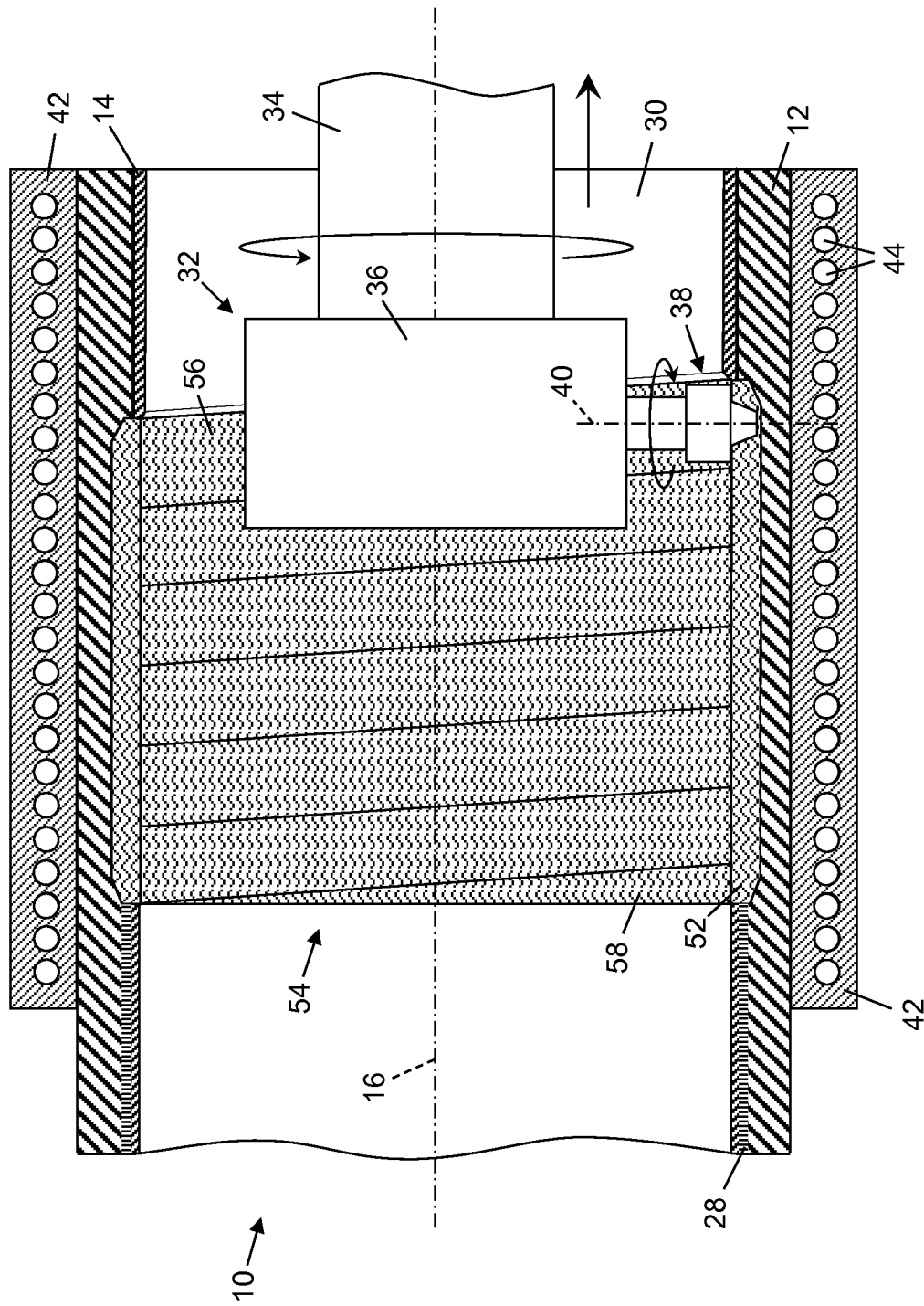

Turning now to FIGS. 9 and 10, these drawings show the TMAZ 52 being extended in an outboard or proximal direction toward the open end of the pipe joint 10. This is done by adding spiral loops 56 to the initial circumferential loop 58 of the weld path 54 shown being formed in FIGS. 6 to 8. To ensure an uninterrupted welded zone along the full length and circumference of the previously unbonded end portion 30, each spiral loop 56 overlaps with an immediately preceding loop, being either the initial circumferential loop 58 or the preceding spiral loop 56.

The successive overlapping spiral loops 56 are formed by continuing to turn the head 36 and the FSW tool 38 about the central longitudinal axis 16 as the cantilever support 34, the head 36 and the FSW tool 38 are retracted proximally from within the pipe joint 10 along the central longitudinal axis 16. During this spiral movement, the FSW tool 38 continues to spin about its spin axis 40 with its probe 50 engaged with the liner sleeve 14 and the outer pipe 12.

Figure 11:
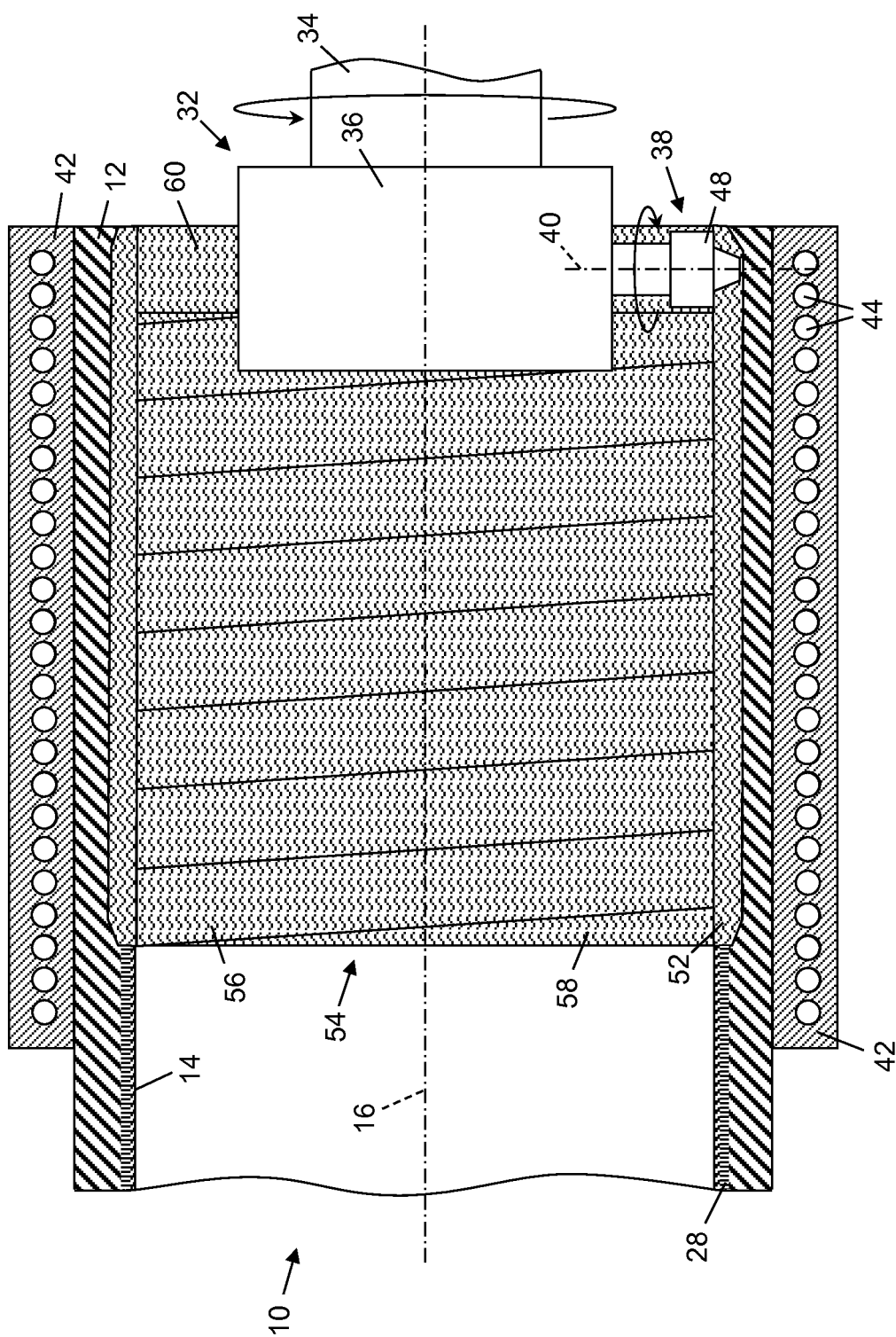

Successive spiral loops 56 are formed in this way until the FSW tool 38 reaches the open end of the pipe joint 10 as shown in FIG. 11. Then, there are various options for terminating the weld. For example, the probe 50 can be withdrawn from the wall of the pipe joint 10 by retracting the FSW tool 38 radially inwardly when the weld path 54 defined by the spiral loops 56 reaches the open end of the pipe joint 10. However, it is preferred to terminate the weld path 54 with a final circumferential loop 60 by pausing proximal retraction of the cantilever support 34 and then turning the head 36 and the FSW tool 38 by at least 360° about the central longitudinal axis 16.

Eventually, the probe 50 must be withdrawn from the wall of the pipe joint 10 by retracting the FSW tool 38 radially inwardly toward the head 36. The result is shown in FIG. 12, where the retracted probe 50 has left behind a hole 62 in the final circumferential loop 60 of the weld path 54. The FSW machine 32 and the back-up clamp 42 can now be removed from the pipe joint 10 as shown.

In principle, the hole 62 could be filled with a suitable filler material. However, FIG. 13 shows the hole 62 being removed by cutting an annular sacrificial piece 64 away from the open end of the pipe joint 10. The sacrificial piece 64 includes the hole 62 and most, but preferably not all, of the final circumferential loop 60 of the weld path 54. Thus, the sacrificial piece 64 is separated from the remainder of the pipe joint 10 by a cutting plane that is longitudinally inboard of the hole 62 but is preferably longitudinally outboard of the last spiral loop 56.

Whilst the sacrificial piece 64 could be removed simply by machining away the open end of the pipe joint 10, it is preferred to cut away the sacrificial piece 64 as a discrete component. This enables the sacrificial piece 64 to be re-used and clamped or tack-welded to the open end of another pipe joint 10 undergoing similar processing. More generally, a sacrificial piece 64 or tab of any suitable shape may be attached temporarily to an end of a pipe joint 10 to terminate a weld. For example, the sacrificial piece 64 is preferably an add-on steel block, that can be parallelepipedic in shape, and that is welded to the end of the pipe joint 10 at the expected exit point of the weld path 54.

FIGS. 4 to 13 illustrate arrangements in which the FSW tool 38 moves relative to a fixed pipe joint 10. Conversely, it will be apparent that relative circumferential and axial movement between the FSW tool 38 and the pipe joint 10 could instead be effected by moving the pipe joint 10 relative to a fixed FSW machine 32. Such an arrangement is shown in FIG. 14.

In FIG. 14, the spin axis 40 of the spinning FSW tool 38 is held stationary as the pipe joint 10 is being turned about the central longitudinal axis 16 by external drive rollers 66. The spin axis 40 intersects a hold-back roller 68 that bears against the exterior of the outer pipe in opposition to the radially-outward forging pressure exerted by the FSW tool 38. The drive rollers 66 and the hold-back roller 68 turn about respective axes that are parallel to the central longitudinal axis 16.

Simply turning the pipe joint 10 about the central longitudinal axis 16 without axial movement of the pipe joint 10 will extend the TMAZ 52 into a circumferential loop 60 shown being formed in FIG. 14. The pipe joint 10 can also be advanced along the central longitudinal axis 16 to effect axial movement relative to the FSW tool 38 when forming spiral loops 56 like those shown in FIGS. 9 to 13.

Relative circumferential and axial movement between the FSW machine 32 and the pipe joint 10 can also be effected by moving both the FSW machine 32 and the pipe joint 10 not just relative to each other but also relative to a fixed supporting structure such as a supporting floor. For example, the pipe joint 10 can be turned about the central longitudinal axis 16 to effect relative circumferential movement while the FSW machine 32 is moved distally and proximally to effect relative axial movement. Simultaneous rotation of the pipe joint 10 and axial movement of the FSW machine 32 will cause the FSW tool 38 to describe a spiral weld path 54.

In a broad sense, it is not essential that the FSW tool 38 must describe a spiral weld path 54 to form the desired welded zone extending across the previously unbonded end portion 30. It would be possible for the weld path to comprise a succession of overlapping loops, each preceded by stepwise displacement of the FSW tool 38 longitudinally relative to the pipe joint 10. Such loops could all lie in planes that are orthogonal to the central longitudinal axis 16. Another possible weld path could comprise overlapping longitudinally-extending sections, each preceded by stepwise displacement of the FSW tool 38 circumferentially relative to the pipe joint 10. Such sections of the weld path could extend parallel to the central longitudinal axis 16.

A weld path could be formed in first and second passes, the first pass extending from a starting point at the end of the pipe joint 10 to a point inside the pipe joint 10 and the second pass being done without removing the FSW tool 38 and returning to the end of the pipe joint 10 according to the process described above. A sacrificial piece 64 at the end of the pipe joint 10 can therefore be used as both an entry point and an exit point.

Two spirals for first and second passes need not have the same pitch, direction or inclination relative to the central longitudinal axis 16 of the pipe joint 10. For example, the first and second passes could be done in opposite rotation, with relative rotational movement between the spin axis 40 of the FSW tool 38 and the lined pipe joint 10 being effected clockwise and then anticlockwise or vice versa.

Many other variations are possible within the inventive concept. For example, the heating and/or cooling elements 44 of the back-up clamp 42 could be controlled individually or in groups to apply heating or cooling locally in accordance with the progress of the FSW tool 38 with respect to the pipe joint 10. In one arrangement, heating could be applied through selected elements ahead of the FSW tool 38 as part of a pre-heat system. Conversely, cooling could be applied locally through selected pipes behind the FSW tool 38 to cool the softened metal quickly after the FSW tool 38 has passed by.

Other pre-heating arrangements are possible. For example, a local induction and/or resistance heater system may be mounted on the head 36 of the FSW machine 32 in front of the FSW tool 38.

To aid overall control of the FSW operation, heating and/or cooling features may be controlled in response to temperature measurements from the TMAZ 52 or from a pre-heat zone.

Heating and cooling systems implemented in the back-up clamp 42 could comprise the same features, for example a heat exchanger that provides for circulation of cold fluid, such as cold water, or hot fluid, such as hot water or steam, depending upon whether cooling or heating is required.

The invention claimed is:

1. A method of manufacturing a bimetallic mechanically-lined pipe, wherein the mechanically-lined pipe comprises a liner sleeve within a host pipe and has a bonded inboard region, in which the liner sleeve is bonded mechanically to the host pipe as the result of an interference fit of the liner sleeve within the pipe, and an unbonded outboard region extending longitudinally from the inboard region toward an end of the mechanically lined pipe, the method comprising:
    inserting a friction stir welding tool into the mechanically lined pipe;
    driving the friction stir welding tool, when spinning about a spin axis, into the liner sleeve to form a thermo mechanically affected zone in which metal of the liner sleeve is bonded with metal of the host pipe; and
    effecting relative movement between the spinning friction stir welding tool and the mechanically lined pipe with respect to a central longitudinal axis of the mechanically lined pipe to extend the thermo mechanically affected zone along a weld path in the previously unbonded outboard region.

2. The method of claim 1, comprising effecting relative rotational movement between the spin axis of the friction stir welding tool and the lined pipe to extend the thermo mechanically affected zone around the liner sleeve.

3. The method of claim 2 comprising forming at least one continuous circumferential loop of the weld path in a plane orthogonal to the central longitudinal axis of the lined pipe.

4. The method of claim 3, comprising forming at least an initial one of said loops at a starting location spaced longitudinally inboard from an end of the lined pipe.

5. The method of claim 3, comprising forming at least a terminal one of said loops at a finishing location at an end of the lined pipe.

6. The method of claim 1, comprising effecting relative longitudinal movement between the spin axis of the friction stir welding tool and the lined pipe to extend the thermo mechanically affected zone along the liner sleeve.

7. The method of claim 6, comprising spiraling the weld path along and around the liner sleeve in successive loops that are inclined relative to the central longitudinal axis of the lined pipe.

8. The method of claim 1, comprising overlapping at least one loop or section of the weld path with a preceding loop or section of the weld path.

9. The method of claim 1, comprising extending the thermo-mechanically affected zone to an open end of the lined pipe.

10. The method of claim 1, comprising terminating the weld path within the lined pipe.

11. The method of claim 10, comprising removing a sacrificial part of the lined pipe on which the weld path terminates.

12. The method of claim 1, comprising extending the thermo-mechanically affected zone beyond the lined pipe to terminate the weld path on a part temporarily attached to the lined pipe, and then removing that part.

13. The method of claim 11, comprising re attaching, to another lined pipe, the part on which the weld path terminates.

14. The method of claim 1, wherein the spin axis extends substantially radially with respect to the lined pipe and the friction stir welding tool is advanced radially outwardly along the spin axis into contact with the liner sleeve.

15. The method of claim 1, wherein the weld path overlaps the inboard region.

16. The method of claim 15, comprising starting formation of the thermo-mechanically affected zone in the inboard region.

* * * * *